United States Patent [19]

Strebel

[11] Patent Number: 5,351,267

[45] Date of Patent: Sep. 27, 1994

[54] PROCESS FOR ELECTRODE CONTROL OF A DC ARC FURNACE, AND AN ELECTRODE CONTROL DEVICE

[75] Inventor: Eduard Strebel, Nussbaumen, Switzerland

[73] Assignee: Asea Brown Boveri Ltd., Baden, Switzerland

[21] Appl. No.: 831,474

[22] Filed: Feb. 5, 1992

[30] Foreign Application Priority Data

Feb. 8, 1991 [CH] Switzerland .................. 406/91

[51] Int. Cl.⁵ ........................................... H05B 7/148
[52] U.S. Cl. ................................ 373/105; 373/104; 373/108
[58] Field of Search ............... 373/105, 102, 104, 106, 373/108, 49, 50

[56] References Cited

U.S. PATENT DOCUMENTS

| | | | |
|---|---|---|---|
| 1,626,431 | 4/1927 | Seede | 373/104 |
| 3,408,447 | 10/1968 | Beck | 373/102 |
| 3,617,595 | 11/1971 | Mulcahy | 373/106 |
| 3,662,075 | 5/1972 | Sakai et al. | 373/108 |
| 4,029,888 | 6/1977 | Roberts et al. | 373/106 |
| 4,096,344 | 6/1978 | Munson | 373/106 |
| 4,320,245 | 3/1982 | Gaydon et al. | 373/108 |
| 4,324,944 | 4/1982 | Weihrich et al. | 373/105 |
| 4,349,912 | 9/1982 | Bello | 373/105 |
| 4,586,187 | 4/1986 | Hein et al. | 373/106 |
| 4,607,373 | 8/1986 | Bergman | 373/104 |
| 4,607,374 | 8/1986 | Inagaki et al. | 373/104 |
| 4,663,764 | 5/1987 | Bretthauer et al. | 373/104 |
| 5,155,740 | 10/1992 | Ao et al. | 373/108 |

FOREIGN PATENT DOCUMENTS

| | | |
|---|---|---|
| 0068180 | 1/1983 | European Pat. Off. . |
| 3439097 | 5/1985 | Fed. Rep. of Germany ...... 373/108 |
| 3442417 | 6/1985 | Fed. Rep. of Germany . |
| 3528750 | 4/1986 | Fed. Rep. of Germany . |
| 2066645 | 8/1971 | France ................ 373/105 |

OTHER PUBLICATIONS

"Die Stromversorgung des ersten Gleichstrom-Lichtbogenofens", Elektrowarme International vol. 41, No. 4, Aug. 1983, pp. 176–180.

Primary Examiner—Bruce A. Reynolds
Assistant Examiner—Tu Hoang
Attorney, Agent, or Firm—Burns, Doane, Swecker & Mathis

[57] ABSTRACT

Direct current arc furnaces (8) have a current regulator (14) for maintaining the current of an arc (10) constant, and an electrode control (18) for affecting the position of an electrode (7) of the arc furnace (8) and thus the length of an arc (10). Control of the position of the electrode (7) is effected by means of a hydraulic electrode adjustment device (21), which is controlled as a function of the difference between a predeterminable electrode control input signal ($\alpha_{soll}$) and an actual rectifier value signal ($\alpha_{ist}$) at the output of the current regulator (14). In this way the length of the arc is controlled in such a way that a rectifier (5) operates with a mean control of, for example, 25° el., independent of the secondary voltage of a furnace transformer (2) and of a set current reference value ($i_{soll}$). Limit values are monitored and undesirable frequencies are filtered out by means of a band-pass filter (16) between the output of the current regulator (14) and a comparator or adder (17) for forming the difference signal between the electrode control input signal ($\alpha_{soll}$) and an actual rectifier value signal ($\alpha_{ist}$).

18 Claims, 2 Drawing Sheets

PROCESS FOR ELECTRODE CONTROL OF A DC ARC FURNACE, AND AN ELECTRODE CONTROL DEVICE

BACKGROUND OF THE INVENTION

1. Field of the Invention

The invention relates to processes for controlling the electrode of a direct current arc furnace, and more specifically to electrical control systems for adjusting the distance between the electrode and the melting bath of the arc furnace.

2. Background

An arc furnace with a DC supply that is controlled by two control circuits is disclosed in EP-B1-0,068,180. A current controller ensures a constant current corresponding to a prescribed desired current value. An electrode control circuit influences the position of the electrode, and thus the arc length. In the event of lengthening of the arc, the current controller must increase the voltage or drive the rectifier so that the current remains constant. However, this works only as long as there is a voltage reserve present. The control of the electrode is performed by an adaptable DC controller. The arc voltage, which is fed via an attenuator to a comparator or summer, serves as the actual DC voltage value. The desired DC voltage value must be calculated in each case taking into account the transformer voltage ratio and the electrode current for each operating point. It is initially limited by a limiter, in accordance with the transformer ratio of the converter transformer, and thus with the possible voltage range of the converter, such that the converter is operated in a steady state at just below the rectifier limit. The desired value is fed smoothed to the summer, so not to overshoot of the actual value in the case of sudden changes in the desired voltage value, which could cause interruption of the arc.

SUMMARY OF THE INVENTION

Accordingly, an object of this invention is to provide an improved process for electrode control of a DC arc furnaces and further to provide an electrode control device such that simpler electrode control becomes possible.

One advantage of the invention consists in that it is possible to avoid calculating the desired value for the electrode control. Instead of the DC voltage, a signal proportional to the control angle is taken from the current controller for the purpose of electrode control. This signal is passed via an attenuator, which in addition to signal matching also monitors the limiting values and filters out undesired frequencies. The desired value is prescribed as a value which determines the mean drive level of the rectifier.

A further advantage consists in that the arc length is adjusted independently of a voltage variation such that the demanded current is achieved by a prescribed drive level at the rectifier. An adequate control range for stabilizing the current is thus always available.

The compensation to a constant drive level at the rectifier also brings with it a constant mean power factor in the supplying network. This is particularly important in the case of static compensation, by which compensation is carried out to a prescribed power factor.

The power of an operating point is very easily determined by selecting a transformer voltage ratio and prescribing the direct current.

BRIEF DESCRIPTION OF THE DRAWINGS

A more complete appreciation of the invention and many of the attendant advantages thereof will be readily obtained as the same becomes better understood by reference to the following detailed description, relating to an exemplary embodiment, and the drawings in which.

DESCRIPTION OF THE PREFERRED EMBODIMENTS

Figure 1:
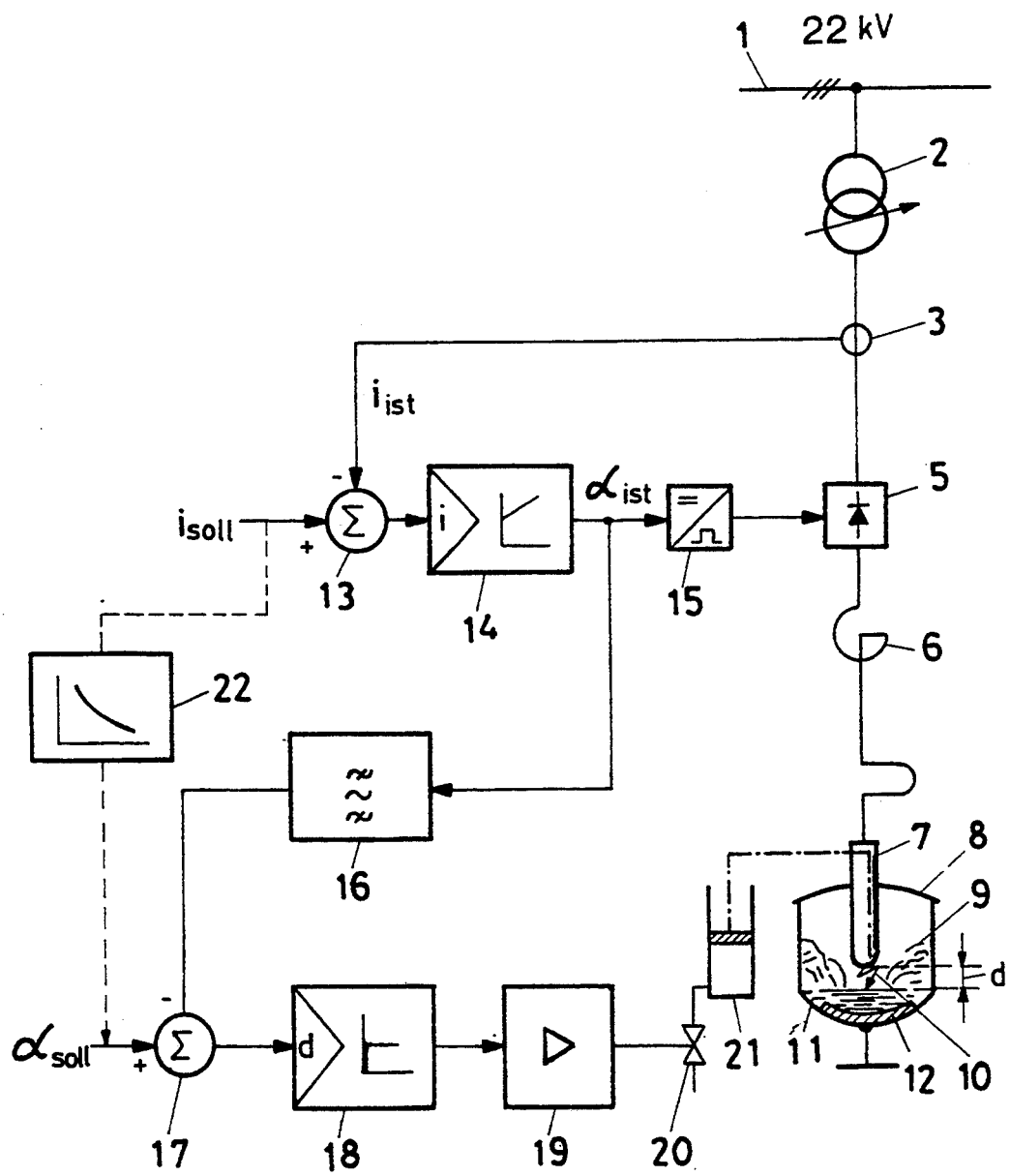
FIG. 1 shows a direct current arc furnace with a current control circuit and an electrode control circuit.

Referring now to the drawings, FIG. 1 shows a furnace transformer (2) with a plurality of tappings, which is connected to an a.c. network (1) with an a.c. voltage of 22 kV, and to the a.c. voltage input of a converter or rectifier (5). The DC voltage side of the rectifier (5) is connected via a choke (6) to a first electrode or cathode (7) of an arc furnace (8). A second electrode or anode (12) arranged in the bottom region of the arc furnace (8) is connected to the positive terminal of the rectifier (5). An arc (10) burns between the lower end of the cathode (7) and a charge or scrap (9) to be melted, and the surface of a melt or a molten bath (11). The symbol (d) denotes an electrode separation or the distance between the cathode (7) and the molten bath (11).

An actual current value signal ($i_{ist}$) is detected and fed to a negative input of a comparator or summer (13) by a current transformer (3) in the alternating current feeder to the rectifier (5). A prescribable desired current value signal ($i_{soll}$) is fed to a positive input of the summer (13), for example from a potentiometer (not represented). The output of, the summer (13) is connected to a current controller (14) with a proportional-plus-integral characteristic, which delivers a rectifier manipulated variable signal ($\alpha_{ist}$), corresponding to a turn-on angle, to a turn-on pulse transformer (15), which controls the rectifier (5).

The rectifier manipulated variable signal ($\alpha_{ist}$) is input to an attenuator or a bandpass filter (16) for signal matching, limiting value monitoring and filtering out undesired frequencies to a negative input of a summer (17). A prescribable electrode controller reference variable signal ($\alpha_{soll}$) is fed, to the positive input of the summer (17). This signal corresponds a desired turn-on angle value in the range of 15°–50°, preferably in the range of 25°–35°. The summer (17) is connected to an electrode controller (18) with a proportional characteristic, which sends a signal to a valve amplifier (19) on a valve (20) of an electrode adjusting device (21). The electrode adjusting device (21), for example a hydraulic pump with an adjusting mechanism and an electrode speed controller, is mechanically coupled to the cathode (7) and permits the cathode height to be adjusted. The electrode adjusting device (21) acts as a first order delay element.

The electrode control operates approximately 10 times slower than the current control. The height adjustment of the cathode (7) is performed such that the rectifier (5) operates on average with a drive level of, for example, 25° electrical, irrespective of the secondary voltage of the furnace transformer (2) and of the adjusted desired current value ($i_{soll}$). For the sake of simplicity, values and signals assigned to them are denoted identically.

The frequencies to be filtered by the bandpass filter (16) comprise frequencies in the range of 0.5 Hz–20 Hz.

A constant mean output factor is attained in the supply of the a.c. network (1) by means of the adjustment to a constant control. The output of the operating point can be very simply determined by the selection of a voltage step of the furnace transformer (2) and pre-setting of the direct current.

If different operating points or a variable load are to be run with a voltage step of the furnace transformer (2), the current reference signal ($i_{soll}$) is predetermined accordingly. A smaller output is attained with a reduced current but still the same control at the rectifier (5). However, because of smaller voltage losses in the a.c. network (1), the arc (10) becomes longer. But, with a smaller output the furnace process requires shorter arcs (10). To achieve this it is possible to predetermine simultaneously a new reference value for the control of the rectifier (5) corresponding to the change of the current reference signal ($i_{soll}$). A function transmitter (22) is provided for this purpose, which as a function of the current reference value ($i_{soll}$) predetermines the electrode control reference input signal ($\alpha_{soll}$) as indicated by dashed lines in FIG. 1. It is also possible to increase the output range.

Figure 2:
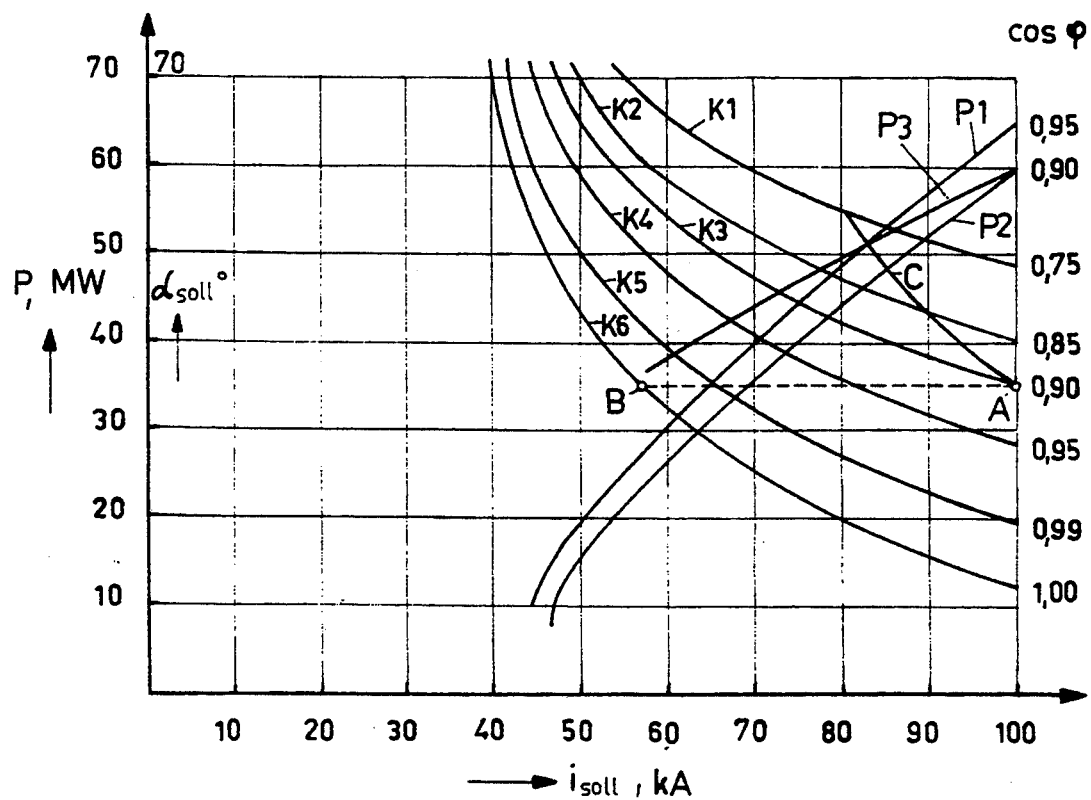
FIG. 2 is a characteristic curve diagram of control input signals for electrode controls as a function of current reference values for different functional factors.

FIG. 2 shows functions realized by of the function transmitter (22) corresponding to curves (K1 to K6), which show, electrode control reference input signal ($\alpha_{soll}$) in electric degrees as parameters for different active factors cos $\Phi$ (0.75 to 1.00). In addition, the actual output (P) in MW taken from the a.c. network is entered on the ordinate. The numerical correspondence with the electrode control reference input signal ($\alpha_{soll}$) is purely coincidental.

The example illustrated relates to an implementation with an actual output (P) of 60 MW with direct current of 100 kA and an installed reactive or compensation power of 30 MVar. This implementation is designed such that an active factor cos $\Phi$=0.9, corresponding to a point (A), results with 100 kA and a control of the rectifier (5) with an actual rectifier value signal ($\alpha_{ist}$) of 35° at the supplying a.c. network (1). A dashed connecting line (A to B) shows the limitation for a minimal rectifier control. The curves (K1) and (K6) for cos $\Phi$=0.75 and 1.0 can also considered to be limits. A curve (C) corresponds to a control of the rectifier (5), where a constant reactive power is obtained from the a.c. network (1) in accordance with point (A); thus it is a limit curve for maximum net reactive power. Therefore the function $\alpha_{soll}=f(i_{soll})$ is intended to be located in the range thus limited, preferably of the curve (K3) for cos $\Phi$=0.9.

If the control of $\alpha_{soll}$=35° were to be retained and the current successively reduced from 100 kA to 60 kA, according to an actual output curve (P3), an actual output of 60 MW would be reduced to 38 MW with cos $\Phi \approx 1$. This is nearly 60% of the maximum output.

If $\alpha_{soll} = f(i_{soll})$ is predetermined where, for example, all operating points with cos $\Phi$=0.9 in accordance with the curve (K3) are run, a control angle ($\alpha_{soll}$) of 45° would be required at 50 kA and an actual output (P) of 15 MW would be achieved in accordance with an actual output curve (P2), which is still 25% of the $\Phi$=0.95 (constant).

Obviously, numerous modifications and variations of the present invention are possible in the light of the above teachings. It is therefore to be understood that within the scope of the appended claims, the invention may be practiced otherwise than as specifically described here.

What is claimed is:

1. A process for electrode control of a direct current arc furnace, comprising the steps of:
   providing a rectifier control signal and a predetermined electrode control reference input signal;
   controlling direct current intensity of an arc current to a predetermined current reference value by said rectifier control signal; and
   controlling an electrode distance between at least one adjustable electrode and a melting bath of the arc furnace as a function of the difference between the predetermined electrode control reference input signal and the rectifier control signal, wherein the rectifier control signal is monitored for exceeding a rectifier limit value prior to comparison with the electrode control reference input signal.

2. A process in accordance with claim 1, wherein the electrode control reference input signal is regulated to an ignition angle reference value in the range between 15° and 50°.

3. A process in accordance with claim 2, wherein the ignition angle reference value is in the range from 25° to 35°.

4. A process in accordance with claim 1, wherein the rectifier control signal is attenuated prior to comparison with the predetermined electrode control reference input signal.

5. A process for electrode control of a direct current arc furnace, comprising the steps of:
   providing a rectifier control signal and a predetermined electrode control reference input signal;
   controlling direct current intensity of an arc current to a predetermined current reference value by said rectifier control signal; and
   controlling an electrode distance between at least one adjustable electrode and a melting bath of the arc furnace as a function of the difference between the predetermined electrode control reference input signal and the rectifier control signal, wherein the rectifier control signal is filtered within a predetermined frequency bandwidth prior to comparison with the electrode control reference input signal.

6. An electrode control device for a direct current arc furnace, comprising:
   at least one adjustable electrode connected with a rectifier controlled by a direct current regulator, and
   an electrode adjustment device for setting an electrode distance between the at least one electrode and a melting bath of the arc furnace, the electrode adjustment device being controlled by an electrode controller,
   an input of the electrode controller receiving an output of the current regulator, wherein the input of the electrode controller receives the output of the current regulator via a band-pass filter.

7. An electrode control device for a direct current arc furnace, comprising:
   at least one adjustable electrode connected with a rectifier controlled by a direct current regulator, and an electrode adjustment device for setting an electrode distance between the at least one electrode and a melting bath of the arc furnace, the electrode adjustment device being controlled by an electrode controller, an input of the electrode controller receiving an output of the current regulator, wherein a difference signal between an electrode control reference input signal and a rectifier control signal is supplied to the input of the electrode controller, the electrode control reference input signal corresponding to a firing angle set value in the range between 15° and 50°.

8. An electrode control device in accordance with claim 7, wherein the rectifier control signal is a firing angle signal for the rectifier.

9. An electrode control device in accordance with claim 8, wherein the predetermined electrode control reference input signal corresponds to the firing angle set value in the range between 25° and 35°.

10. A process for electrode control of a direct current arc furnace, comprising the steps of:
providing a rectifier control signal and a predetermined electrode control reference input signal;
controlling direct current intensity of an arc current to a predetermined current reference value by said rectifier control signal; and
controlling an electrode distance between at least one adjustable electrode and a melting bath of the arc furnace as a function of the difference between the predetermined electrode control reference input signal and the rectifier control signal, wherein the electrode control reference input signal is formed as a function of the predetermined current reference value wherein a predetermined phase is maintained, the phase not exceeding a predetermined phase limit.

11. A process in accordance with claim 10, wherein the electrode control reference input signal is controlled such that power supplied to said electrode does not exceed a predetermined reactive power.

12. An electrode control apparatus for controlling a position of an electrode in a direct current arc furnace, said apparatus comprising:
a rectifier;
an adjustable electrode connected to said rectifier;
a direct current controller for generating a rectifier control signal which is input to said rectifier for controlling said rectifier;
an electrode positioning means for setting a distance between said electrode and a melting bath of said arc furnace;
an electrode controller for controlling said electrode positioning means according to said rectifier control signal; and
means for filtering said rectifier control signal, said filtering means being connected between said current controller and said electrode controller.

13. An electrode control apparatus for controlling a position of an electrode in a direct current arc furnace, said apparatus comprising:
a rectifier;
an adjustable electrode connected to said rectifier;
a direct current controller for generating a rectifier control signal which is input to said rectifier for controlling said rectifier;
an electrode positioning means for setting a distance between said electrode and a melting bath of said arc furnace;
an electrode controller for controlling said electrode positioning means according to said rectifier control signal, said rectifier control signal being a firing angle signal for the rectifier; and
a summer for receiving an electrode control reference signal, a difference between said rectifier control signal and said electrode control reference signal being input to said electrode controller.

14. The electrode control apparatus of claim 13, wherein said electrode control reference signal corresponds to a firing angle of between 15° and 50°.

15. A method of controlling a position of an electrode in a direct current arc furnace, said method comprising the steps of:
providing a rectifier control signal and an electrode control reference signal;
filtering said rectifier control signal;
determining a difference between said filtered rectifier control signal and said electrode control reference signal; and
setting a distance between an adjustable electrode and a melting bath of said arc furnace according to said difference.

16. The method of claim 15, wherein said electrode control reference signal has an ignition angle between 15° and 50°.

17. An electrode control device for a direct current arc furnace, comprising:
at least one adjustable electrode connected with a rectifier controlled by a direct current regulator, and
an electrode adjustment device for setting an electrode distance between the at least one electrode and a melting bath of the arc furnace, the electrode adjustment device being controlled by an electrode controller,
an input of the electrode controller receiving an output of the current regulator, wherein the input of the electrode controller is in contact with the output of the current regulator via an attenuator element.

18. A method for electrode regulation of a direct current arc furnace, said method comprising the steps of:
a) supplying direct current from an alternating current network via a controlled rectifier;
b) regulating the direct current by a current regulator as a function of a detected actual current value of direct current to the arc furnace and by a predeterminable command current value, which current regulator furnishes the rectifier with a rectifier control signal;
c) filtering said rectifier control signal;
d) regulating electrode spacing between at least one adjustable electrode and a melt bath of the arc furnace using an electrode regulator; and
e) regulating the electrode spacing based on a difference between a predeterminable electrode regulator guide variable signal and the rectifier control signal of the current regulator.

* * * * *